(12) United States Patent
Adzhian et al.

(10) Patent No.: US 6,244,040 B1
(45) Date of Patent: Jun. 12, 2001

(54) GAS GENERATOR FOR LIQUID PROPELLANT ROCKETS

(75) Inventors: Alexei Pogosovich Adzhian, Moscow; Vladimir Jurievich Bogushev; Valentina Dmitrievna Kolesnikova, both of Moskovskaya olbast; Alexandr Mikhailovich Samsonov, Moscow; Jury Anatolievich Tjurin; Boris Ivanovich Katorgin, both of Moskovskaya oblast, all of (RU)

(73) Assignee: Otkrytoe Aktsionernoe Obschestvo "Nauchno-Proizvodstvennoe Obiedinenie 'Energomash,' Imeni Akademika V.P. Glushko", Moskovskaya Oblast (RU)

( * ) Notice: Subject to any disclaimer, the term of this patent is extended or adjusted under 35 U.S.C. 154(b) by 0 days.

(21) Appl. No.: 09/391,856

(22) Filed: Sep. 8, 1999

(30) Foreign Application Priority Data

Mar. 1, 1999 (RU) .................................................. 99103733

(51) Int. Cl.$^7$ ........................................................ F02K 9/42
(52) U.S. Cl. .................................................................. 60/258
(58) Field of Search ....................................... 60/257, 258

(56) References Cited

U.S. PATENT DOCUMENTS

| | | |
|---|---|---|
| 3,712,059 * | 1/1973 | Drezhage ................................ 60/258 |
| 4,974,415 | 12/1990 | Shekleton et al. ..................... 60/733 |
| 5,339,635 | 8/1994 | Iwai et al. .............................. 60/733 |
| 5,660,039 * | 8/1997 | Sion et al. ............................. 60/258 |
| 6,112,515 * | 9/2000 | Klotz et al. ............................ 60/258 |

* cited by examiner

Primary Examiner—Charles G. Freay
(74) Attorney, Agent, or Firm—Christie, Parker & Hale, LLP

(57) ABSTRACT

A gas generator in particular for driving liquid-propellant rockets, having, a structural envelope, an outlet pipe, a cover connected to the structural envelope from the side opposite to the outlet pipe. A bush is made on the inner side of the cover. An injector face is mounted on the bush end to form a space between the injector face and the cover. Chambers are made in the injector face and the cover. A spacer, mounted inside the structural envelope, is fastened on the outlet pipe and the bush to form an annular space there between. Mixing modules are fastened in the cover and in the injector face chambers. A propellent feed inlet pipe is fastened to the outer surface of the cover inside which a propellant space is made. An oxidizer feed inlet pipe is fastened inside the structural envelope and communicates with the annular space. The annular space communicates with the space between the cover and the injector face via ports made in the bush. The propellant space communicates with propellant passages of the mixing modules through calibrated openings made in the cover. The space between the cover and the injector face communicates with annular oxidizer passages of the mixing modules via openings. Slots are made in the injector face between housing of the mixing modules and walls of the chambers.

5 Claims, 3 Drawing Sheets

GAS GENERATOR FOR LIQUID PROPELLANT ROCKETS

FIELD OF THE INVENTION

The invention relates to the field of power machine-building and concerns the Fulfillment of gas generators for driving gas turbines in particular for liquid-propellant rocket engines.

BACKGROUND OF THE INVENTION

A gas generator for a liquid-propellant rocket engine is known that comprises a spherical structural envelope, an outlet pipe rigidly fastened to it, propellant and oxidizer inlet pipes and an injector face, in which injectors are coaxially installed (U.S. Pat. No. 4,974,415, 1990).

In the known construction it is difficult to ensure high-quality mixing and a stable combustion process at high ratio of the oxidizer flow rate to the propellant flow rate with compactness of the whole unit.

The solution most similar to the present invention is a gas generator comprising a structural envelope with an outlet pipe, a cylindrical combustion chamber located in the structural envelope, a cover stationarily fastened on the structural envelope, an injector face located in the structural envelope, mixing modules provided with a housing with a propellant passage, an annular oxidizer passage and a mixing chamber, the housing fixed in the injector face and inlet pipes for feeding the propellant and oxidizer which are connected respectively propellant passages and oxidizer passages of the mixing modules (U.S. Pat. No. 5,339,635, 1994).

In the known gas generator it is impossible to produce generator gas with a heightened amount of oxidizer therein that is necessary for the operation in liquid-propellant rocket engines using oxygen.

SUMMARY OF THE INVENTION

The object of the present invention is to enhance the reliability and operating efficiency of gas generators for liquid-propellant rocket engines.

The technical result which may be attained where the present invention is carried out is an improvement of the mixing the quality combustible mixture and stability of its combustion when liquid oxygen and kerosene are used as the main propellant components.

The essence of the invention is that a gas generator for liquid-propellant rocket engines comprises a structural envelope an outlet pipe rigidly fastened to the structural envelope, a cover having a bush made on the inner surface thereof and rigidly connected to the said structural envelope from the side opposite to the outlet pipe, an injector face with through chambers, which is stationarily mounted in a bush to form a space between the injector face and the cover, a spacer mounted inside the structural envelope to form an annular space between them and fastened at one end to the outlet pipe and at another end outer surface of the bush and a combustion chamber envelope disposed inside the spacer and the outlet pipe. Mixing modules, are positioned in the space between the cover and the injector face, each of the modules has a housing with a propellant passage an annular oxidizer passage and a mixing chamber located coaxially therein the housing fastened in the cover from the propellant passage side, and from the mixing chamber side in the injector face chamber. A propellant feed inlet pipe is fixed in the cover to form a propellant space and an oxidizer feed inlet pipe is fixed in the middle part of the structural envelope and communicates with its annular space, The annular space of the structural envelope communicates with the space between the cover and the injector face through ports made in the bush, the propellant passage of each mixing module is connected to the propellant space by calibrated openings made in the cover, the space between the cover and the injector face communicates with the annular oxidizer passages of the mixing modules through the openings made in the housing of the mixing module and is hydraulically connected to the chamber in the injector face.

A cover may be provided with an insert positioned in the propellant space, wherein the space between the cover and the injector face to the chambers may be made in the form of slots positioned on the external surface of the part of housing to which the mixing modules are attached, in an injector face calibrated openings are made, in the insert, and the hydraulic coupling of the combustion. The injector face chambers may be provided with tapered bores made from the side of chamber, wherein the tapered surfaces of the bores of adjacent chambers are made intersecting.

The combustion chamber envelope may be installed in a spacer and outlet pipe to form a cooling space there between communicating with the annular space of the structural envelope. The structural envelope may be made spherical, the outlet pipe may be tapered and connected to the structural envelope by its wide end, and the combustion chamber envelope wherewith is made with cylindrical and tapered sections.

BRIEF DESCRIPTION OF THE DRAWINGS

A gas generator constructed in accordance with the invention will now be described, by the way of example, with the reference to the accompanying drawings, in which:

FIG. 7 is a cross-sectional view taken along the line D—D in FIG. 3.

DESCRIPTION OF THE PREFERRED EMBODIMENT

Figure 1:
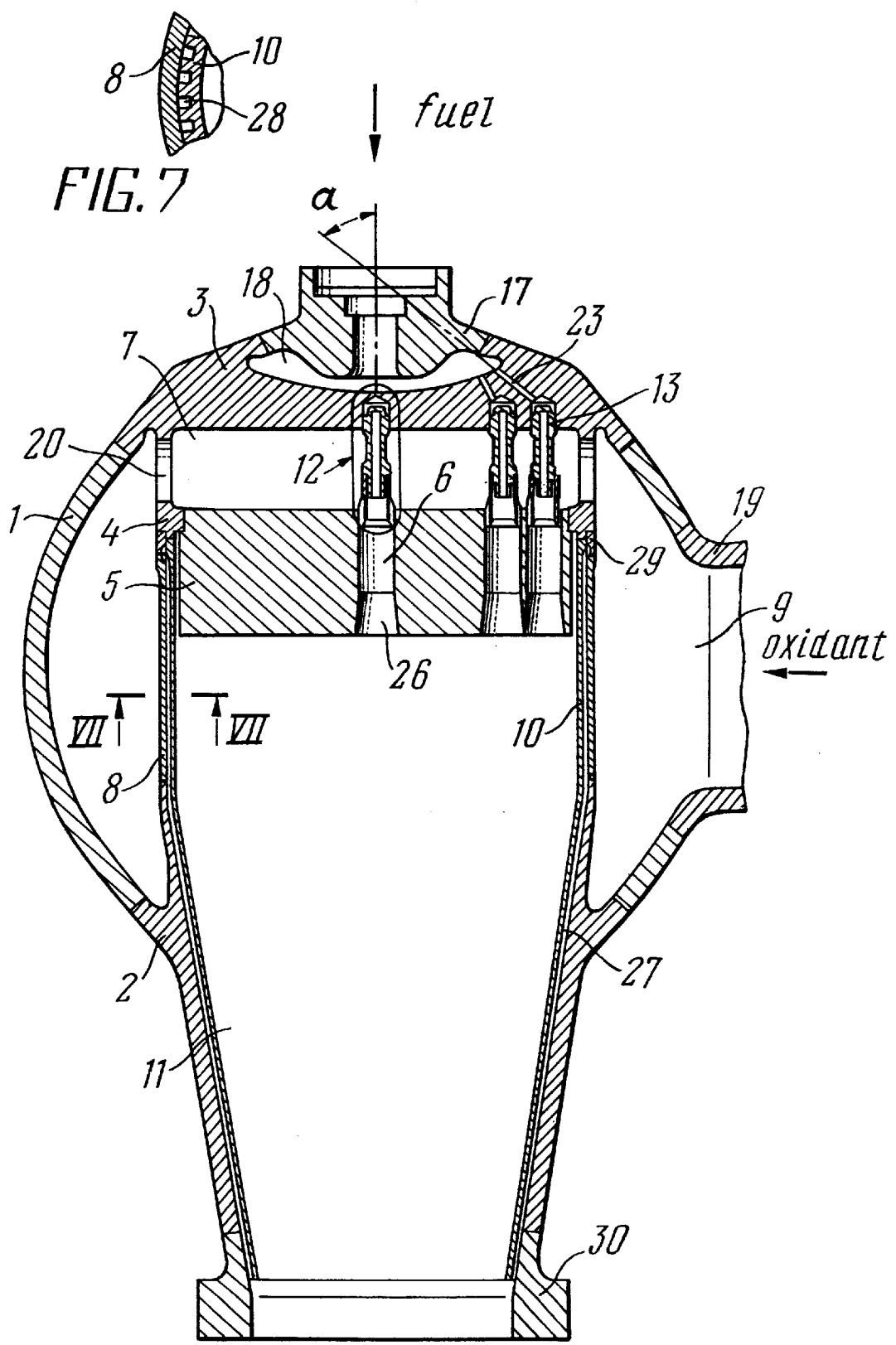
FIG. 1 is a longitudinal cross-sectional view of a gas generator embodying the present invention.

Referring to FIG. 1, the gas generator for liquid-propellant rocket engines comprises a spherical structural envelope 1, a tapered outlet pipe 2 fastened fixedly to it, and a cover 3, provided with a bush 4 on its internal surface and fastened fixedly to the structural envelope 1 from the side opposite to the outlet pipe 2. The injector face 5 with through chambers 6 is fixed in the bush 4 to form a space 7 between the face 5 and the cover 3. A spacer 8 is installed in the structural envelope 1 to form an annular space 9 between them, one end of the spacer 8 being fastened to the outlet pipe 2 and the other end being fastened to the external surface of the bush 4.

Figure 2:
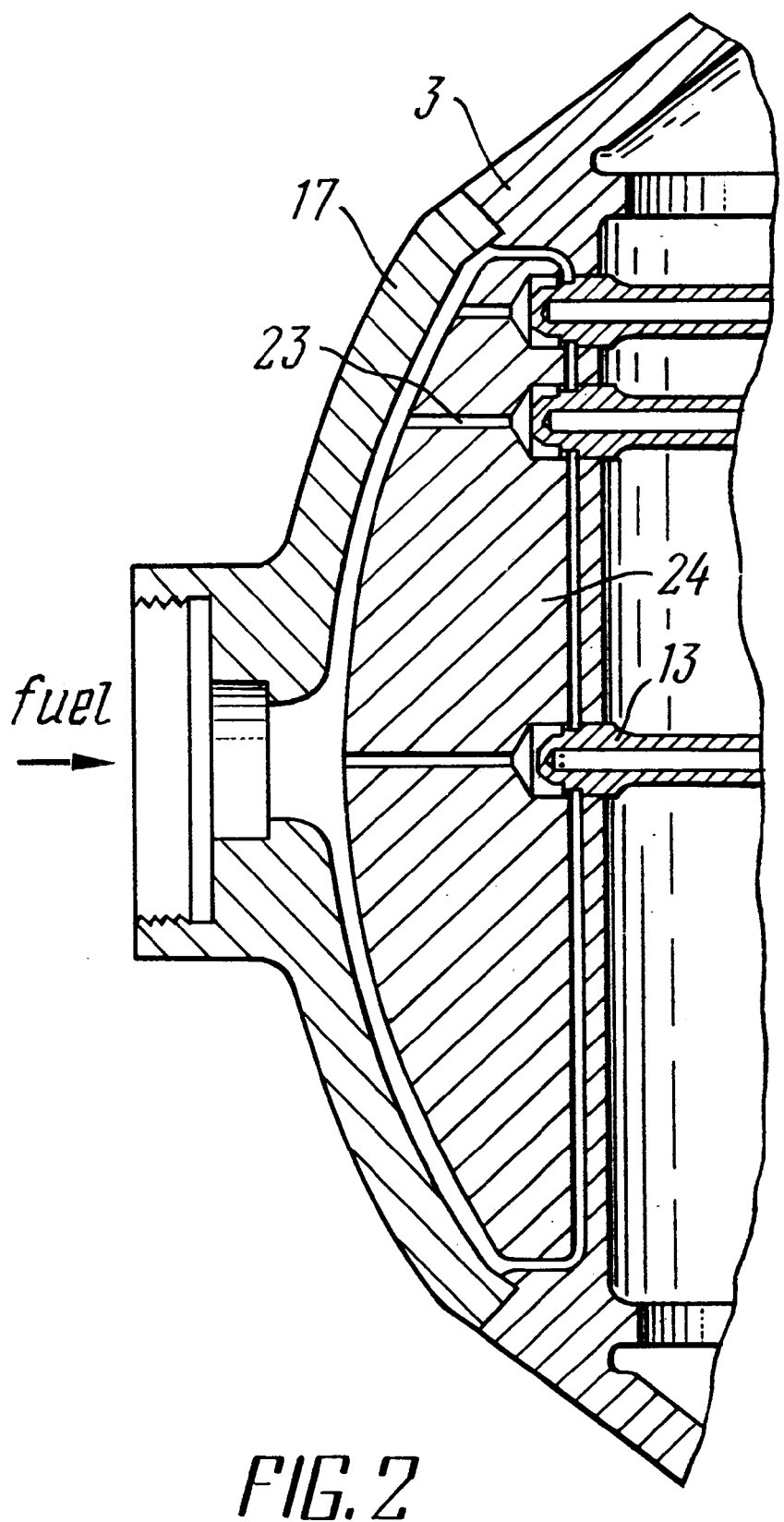
FIG. 2 is a cross-sectional view of a cover with an insert.
Figure 3:
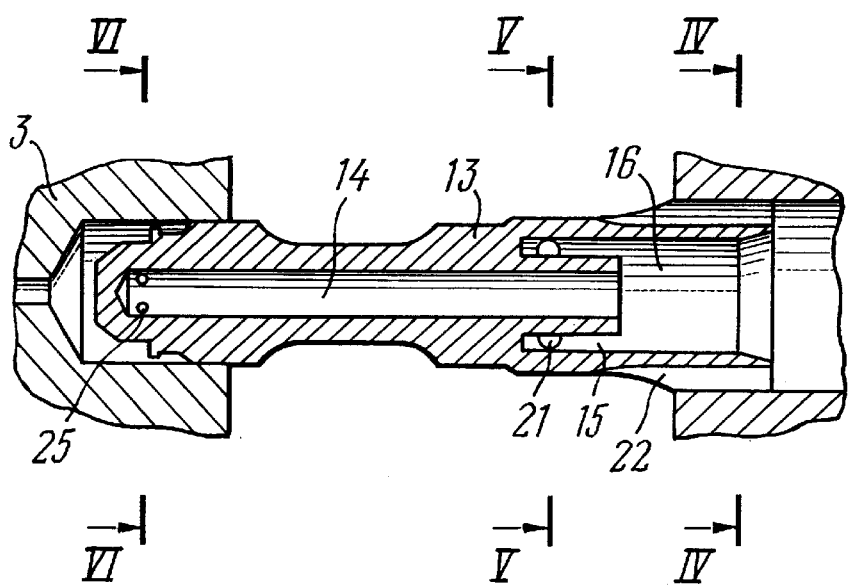
FIG. 3 is a cross-sectional view of a mixing module.
Figure 4:
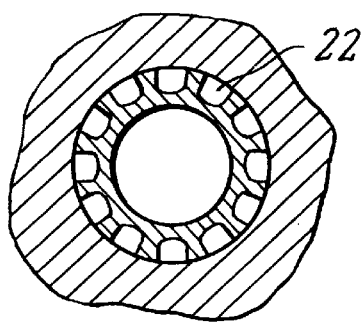
FIG. 4 is a cross-sectional view taken along the line A—A in FIG. 3.
Figure 5:
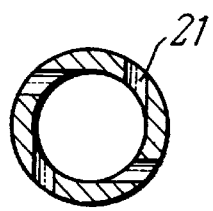
FIG. 5 is a cross-sectional view taken along the line B—B in FIG. 3.
Figure 6:
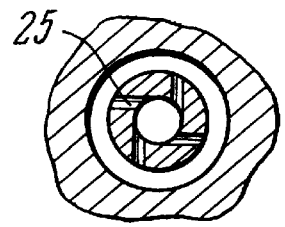
FIG. 6 is a cross-sectional view taken along the line C—C in FIG. 3.

The envelope 10 of the combustion chamber 11 is located inside the spacer 8 and outlet pipe 2. Arranged in the space 7 between the cover 3 and injector face 5 are mixing modules 12 (FIGS. 1, 2, 3), each of which has a housing 13 with a propellant passage 14 annular oxidizer passage 15 and a mixing chamber 16, which are displaced coaxially inside the housing. The housing 13 is fixed in the cover 3 from the side of the propellant passage 14 and in the chamber 6 of the injector face 5 from the side of mixing chamber 16 (FIGS. 1, 2, 3). A propellant feed inlet pipe 17 is fixed in the cover 3 and forms a propellant space 18, while an oxidizer feed inlet pipe 19 is fixed in the middle part of the structural envelope 1 and communicates with its annular space 9 (FIG. 1).

The annular space 9 of the structural envelope 1 communicates with the space 7 between the cover 3 and the injector face 5 through ports 20 made in the bush 4 and connects the oxidizer feed inlet pipe 19 to the annular oxidizer passages 15 of the mixing modules 12 through openings 21 made in the housing 13 and with the chambers 6 through slots 22 located on the external surface of the part of the housing 13 fixed in the chamber 6 (FIGS. 1, 2, 3, 4, 5).

The propellant passages 14 of the mixing modules 12 are connected to the propellant space 18 through calibrated openings 23 which may be made in the housing 13 or in an insert 24 located in the propellant space 18, and through tangential openings 25 made in the housing 13 (FIGS. 1, 2, 3, 6).

The through chambers 6 have tapered bores 26 made from the combustion chamber 11 side, the tapered surfaces of the bores 26 of the adjacent chambers 6 being made to intersect (FIG. 1).

The envelope 10 is mounted in the spacer 8 and the outlet pipe 2 to form a cooling space 27 between them that is made in a form of passages 28 between ribs of the envelope 10 communicating through openings 29 with the annular space 9 of the structural envelope 1 (FIGS. 1, 7). The cooling space 27 communicates with the combustion chamber 11 through an annular slot 30 located at the gas generator outlet (FIG. 1).

During the generator operation the propellant from the pipe 17 fills the propellant space 18 and being uniformly distributed between the mixing modules 12 is fed through the calibrated openings 23 and tangential openings 25 into the propellant passages 14 and further into the mixing chambers 16 (FIGS. 1, 3). The liquid oxidizer is fed into the annular space 9 through the pipe 19, fills the space 7 through the ports 20 and then through the openings 21 enters the mixing chamber 16, where it is mixed with the propellant and initiates its ignition. The combustion process proceeds at an excess of oxidizer. The oxidizer is also fed into the chamber 6 through the slots 22 (FIGS. 1, 3) to provide mixing of the products of propellant combustion with the oxidizer for afterburning these components in the combustion chamber 11. At the gas generator outlet the oxidizer fed through the annular slot 30 (FIG. 1) is added to the gas generation products.

The proposed gas generator may be most successfully used in the gas generator used for driving gas turbines in particular for liquid-propellant rocket engines using the liquid oxygen and kerosene as the main propellant components.

We claim:

1. A gas generator comprising:
    (a) a structural envelope;
    (b) an outlet pipe fastened to the structural envelope;
    (c) a cover connected to the structural envelope from a side opposite to the outlet pipe;
    (d) a bush made on the cover inner surface and displaced coaxially to the structural envelope;
    (e) an injector face mounted on a bush end to form a space between the injector face and the cover;
    (f) chambers made through the injector face;
    (g) a spacer made in the form of a tube fastened at one end to the outlet pipe and at another end to an outer surface of the bush and coaxially mounted inside the structural envelope to form an annular space between them;
    (h) a combustion chamber envelope disposed inside the spacer and the outlet pipe;
    (i) mixing modules, in a housing of each of which a propellant passage and a mixing chamber which are made communicating sequentially along a longitudinal axis of the housing, and an annular oxidizer passage located coaxially to them and communicating with the mixing chamber are made, the mixing modules are fastened in the cover from the propellant passage side and/or in the injector face chambers from their mixing chamber side;
    (j) a propellant feed inlet pipe fixed on an outer surface of the cover, inside which a propellant space is formed, located at an outlet of the propellant feed inlet pipe and communicating with the propellant passages of the mixing modules;
    (k) an oxidizer feed inlet pipe fixed in the structural envelope and communicating through the annular space between the structural envelope and the spacer with the annular oxidizer passages of the mixing modules;
    (l) wherein the annular space between the structural envelope and the spacer communicates with the space between the cover and the injector face through ports made in the bush, the propellant space located at the outlet of the propellant feed inlet pipe communicates with the propellant passages of the mixing modules through calibrated openings made in the cover, the space between the cover and the injector face communicates with the annular oxidizer passages of the mixing modules through openings made in the mixing module housing, slots are made in the injector face between the housing of the mixing modules and the chamber walls for additional hydraulic connection of the space between the cover and the injector face to the chambers of the injector face.

2. A gas generator as claimed in claim 1, wherein the cover is provided with an insert in which calibrated openings are made.

3. A gas generator as claimed in claim 1, wherein the injector face chambers are made with tapered bores provided in the injector face, the tapered surface of the bores of adjacent chambers intersecting from the side of the outlet pipe.

4. A gas generator as claimed in claim 1, wherein the combustion chamber envelope is installed with the possibility of forming a cooling space between the combustion chamber envelope, the spacer and the outlet pipe, the cooling space communicating with the annular space.

5. A gas generator as claimed in claim 1, wherein the structural envelope is made of a spherical form that is truncated by a plane from the side of the outlet pipe, the outlet pipe is made tapered and connected to the structural envelope at its wide end.

* * * * *